United States Patent [19]

Cote et al.

[11] Patent Number: 4,945,484
[45] Date of Patent: Jul. 31, 1990

[54] METHOD AND CONTROL SYSTEM FOR CONTROLLING AMT SYSTEM INCLUDING DETECTION OF ERRONEOUS GEAR NEUTRAL INDICATION

[75] Inventors: William F. Cote, Farmington Hills; William J. Mack, Clarkston, both of Mich.

[73] Assignee: Eaton Corporation, Cleveland, Ohio

[21] Appl. No.: 256,960

[22] Filed: Oct. 13, 1988

[51] Int. Cl.$^5$ .............................................. B60K 41/04
[52] U.S. Cl. .................................. 364/424.1; 74/866; 74/335
[58] Field of Search ............... 364/424.1, 187; 74/866, 74/856, 335, 336 R

[56] References Cited

U.S. PATENT DOCUMENTS

| | | | |
|---|---|---|---|
| 4,635,508 | 1/1987 | Tatsumi | 364/424.1 |
| 4,667,541 | 5/1987 | Shimaoka et al. | 364/424.1 |
| 4,702,127 | 10/1987 | Cote | 74/866 |

Primary Examiner—Parshotam S. Lall
Assistant Examiner—Christopher L. Makay
Attorney, Agent, or Firm—H. D. Gordon

[57] ABSTRACT

A control method/system for an automatic/semi-automatic mechanical transmission system (10) is provided including logic rules by which a faulty input signal indicative of a gear neutral condition (GNS=$\phi$) can be detected and, in the event of such detection, a fail safe mode of operation is implemented.

14 Claims, 4 Drawing Sheets

METHOD AND CONTROL SYSTEM FOR CONTROLLING AMT SYSTEM INCLUDING DETECTION OF ERRONEOUS GEAR NEUTRAL INDICATION

BACKGROUND OF THE INVENTION

This invention relates to automatic and semi-automatic power transmissions providing a plurality of gear reduction ratios, such as vehicular automatic mechanical transmissions (i.e. "AMTs"), and, to control systems and methods therefor. In particular, the present invention relates to control systems and methods for vehicular automatic/semi-automatic mechanical transmission systems wherein gear selection and/or shift decisions are made and/or executed based upon measured and/or calculated parameters such as engagement condition of the transmission, vehicle or transmission output shaft speed, transmission input shaft speed, engine speed, throttle position, rate of change of throttle position, rate of change of vehicle and/or engine speed and the like. More particularly, the present invention relates to a method/system for controlling an AMT system utilizing sensors for providing input signals indicative of the presence of a transmission gear neutral condition, engine, transmission input shaft and transmission output shaft rotational speeds, etc. including sensing of a faulty signal from the gear neutral sensors and modifying the system operation logic in response to detection of such fault.

DESCRIPTION OF THE PRIOR ART

The use of automatic and/or semi-automatic transmissions of both the automatic mechanical type utilizing positive clutches and of the planetary gear type utilizing frictional clutches is well known in the prior art, as are control systems therefor. Electronic control systems utilizing discrete logic circuits and/or software controlled microprocessors for automatic transmissions wherein gear selection, shift execution and/or shift decisions are made based upon certain measured and/or calculated parameters such as the presence of a transmission gear neutral condition, vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic/semi-automatic transmission control systems for vehicles may be seen by reference to U.S. Pat. Nos. 4,722,248; 4,722,237; 4,676,115; 4,648,290; 4,361,060; 4,551,802; 4,527,447; 4,425,620; 4,463,427; 4,081,065; 4,073,203; 4,253,348; 4,038,889; 4,226,295; 3,776,048; 4,208,929; 4,039,061; 3,974,720; 3,478,851; 3,942,393 and 4,595,986, the disclosures of which are all hereby incorporated by reference.

While the above referenced automatic/semi-automatic transmission control systems, and similar systems, are effective to control an automatic transmission by selecting and/or engaging a desired gear ratio which will tend to optimize the fuel economy and/or performance of the vehicle in view of the sensed parameters and then commanding a shift into the selected gear ratio, such control systems were not totally acceptable as the predetermined programs utilized did not include logic routines, or methods, to recognize and identify a fault in the input signals from the gear neutral condition sensors and/or could not modify the predetermined program to provide an acceptable response to such a sensed fault.

An AMT control method for sensing gear neutral and not gear neutral sensor faults, and for modifying the control logic in tolerance to such faults, is disclosed in U.S. Pat. No. 4,702,127, the disclosure of which is hereby incorporated by reference. While this control method/system is an improvement over the then existing prior art, it was not totally satisfactory as faulty gear neutral signals during a shifting operation were not detected and/or the response to such faults allowed continued vehicle operation under conditions which could lead to undesirable vehicle operation and/or damage to the transmission system.

SUMMARY OF THE INVENTION

In accordance with the present invention, the drawbacks of the prior art have been overcome or minimized by providing a control system, preferably an electronic control system, and control method, for automatic/semi-automatic mechanical transmission systems wherein gear selection and shift decisions are made and/or executed based upon measured and/or calculated parameters including at least input signals indicative of the presence of a gear neutral condition, transmission input shaft speed and transmission output shaft speed. Other inputs/parameters, such as signals indicative of throttle position and/or rate of change of throttle position, condition of the master clutch, currently engaged gear ratio, operation of the vehicle brakes, and the like are also utilized to make decisions for control of the AMT system.

The predetermined logic rules or programs by which the various input signals are processed include a method for detecting a fault in the input signals from the gear neutral sensors and a method for modifying the predetermined logic in response to a sensed fault to provide an acceptable set of logic rules for limited (i.e. limp home/limp off road) continuing operation of the system until such time as the fault is corrected.

A gear neutral condition sensor input signal is considered to be faulty if the value thereof is not indicative of the true engaged or disengaged condition of the transmission or transmission section monitored thereby.

The above is accomplished by establishing a set of relationships between the gear neutral condition input signals, the transmission input shaft speed signal and the transmission output shaft speed signal which, under defined conditions, must be true. If, under the defined conditions, these relationships are not true, a fault in the input signals from one or more of the sensors exists, and various relationships are evaluated to identify the one or more faulty sensors. If the gear neutral sensor is in fault, the logic routines are modified to allow a continued system operation in only the currently engage ratio for limp home/limp off road purposes until such time as the fault is corrected.

This invention detects a false transmission neutral indication for automatically/semi-automatically controlled manual transmissions that utilizes a sensor to indicate that the transmission is in a neutral state. In actuality, the sensor usually senses a position of a shift rail rather than of the engaged gear. The coupling to the sensor is through a shift yoke member being driven by an air pressurized shift rail to a dog clutch for the engaged gear. A false transmission neutral indication can readily occur due to deflections of the mechanical members, wear at the dog clutch, shift yoke and/or sensor mechanism, a malfunctioning sensor and the like.

The AMT control algorithms require the indication of a transmission neutral signal prior to taking any action to bring the transmission jaw clutch members to synchronous. Once the sensor indicates neutral, the control actuates a system component that applies a torque to the input of the transmission bringing the engaging jaw clutch members to synchronous for the gear selected. The control system continuously monitors the input speed and output speed of the transmission and calculates a speed difference across the gears to be engaged, called error. At the same time, the system continuously calculates the speed difference for the last gear the transmission was in, called FLTERROR. If the transmission is truly in neutral, the value of error will decrease and the value of FLTERROR will increase as the input shaft approaches synchronous rotational speed for the ratio to be engaged. Using these facts, an algorithm was designed, such that, during a shift and when the sensor indicates that the transmission is in neutral and a system component is commanded to apply a torque to the input of the transmission the value of FLTERROR is monitored and compared to a calibration value for a short period of time. The selection of the calibration value is based upon the speed steps between gears, minimum obtainable error values, and mechanical backlash between the measuring speed sensors. If during that period of time, the value of FLTERROR does not exceed the calibration value, a fault is declared. This fault indicates that the transmission has not come out of gear, even though the sensor indicates that it has. Continuing to apply a torque to the input of the transmission further prevents it for coming to neutral due to torque lock on the clutches. Once the fault is established the system reselects the last gear and prohibits any further gear selections. Since it has already been established that the transmission did not come out of the last gear, no further synchronization is required. The control system allows the vehicle to continue to operate in the last gear until the vehicle comes to a stop, at which time the vehicle is rendered disabled.

Accordingly, it is an object of the present invention to provide a new and improved control method/system for automatic mechanical transmission systems which involves sensing and identifying a fault in the gear neutral sensors and modifying the logic routines or algorithms by which the system is operated in response to sensed fault.

This and other objects and advantages of the present invention will become apparent from a reading of the description of the preferred embodiment taken in connection with the attached drawings.

DESCRIPTION OF THE PREFERRED EMBODIMENT

Figure 1:
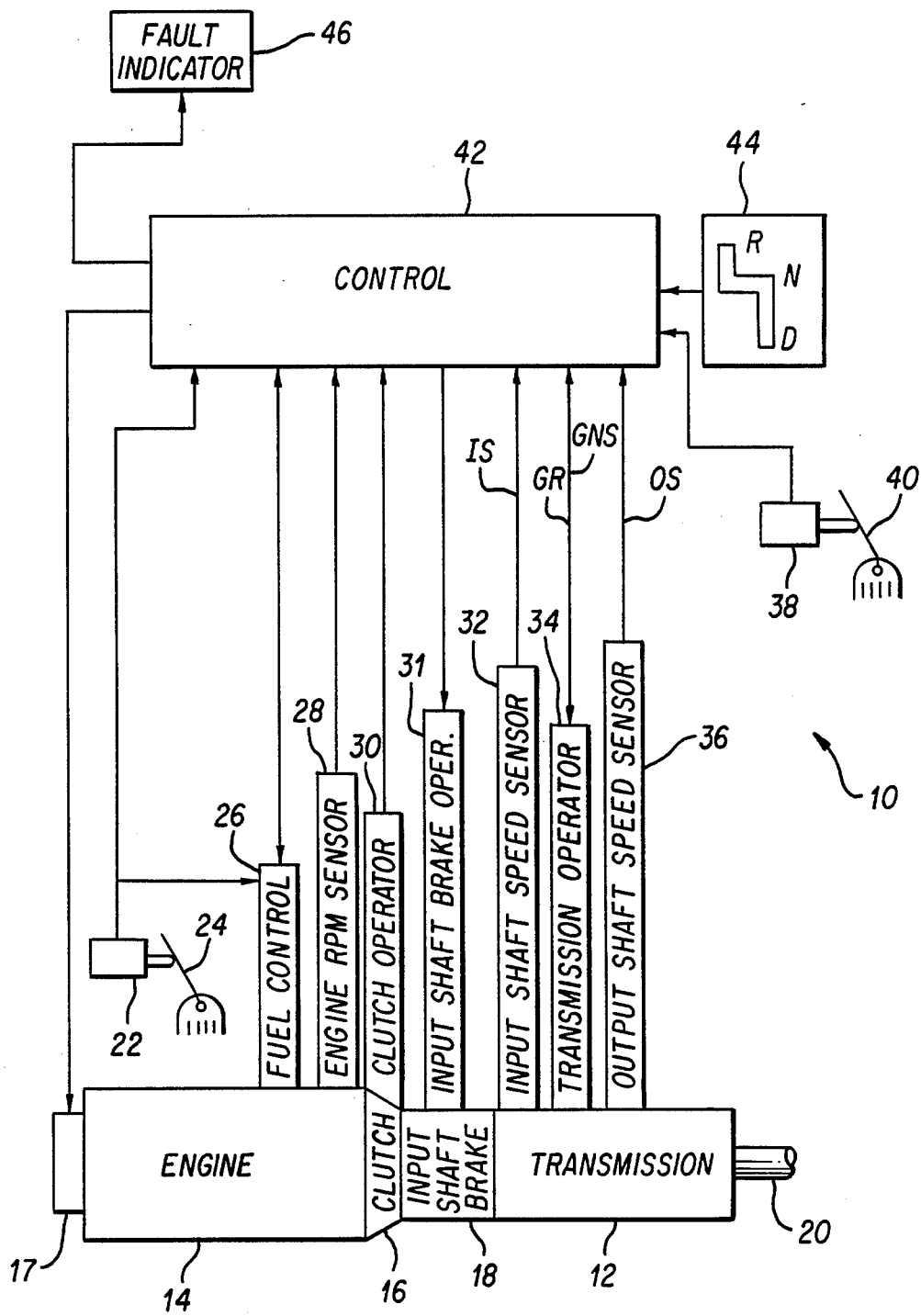
FIG. 1 is a schematic illustration of the components and interconnections of the automatic mechanical transmission control system of the present invention.

In this disclosure, certain terminology will be used for convenience and reference only and will not be limiting. For example, the terms "forward" and "rearward" will refer to directions forward and rearward of the transmission or transmission shift bar housing assembly as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward" will refer to directions as taken in the drawings in connection with which the terminology is used. All foregoing terms include the normal derivatives and equivalents thereof.

FIG. 1 schematically illustrates an automatic mechanical transmission system 10 including an automatic multi-speed compound change gear transmission 12 driven by a throttle controlled engine 14, such as a well known diesel engine, through a master clutch 16. An engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmission 12 is output shaft 20 which is adapted for driving connection to an appropriate vehicle component such as the differential of a drive axle, a transfer case or the like as is well known in the prior art.

The above mentioned power train components are acted upon and monitored by several devices, each of which will be discussed in greater detail below. These devices include a throttle position or throttle opening monitor assembly 22 which senses the position of the operator controlled vehicle throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of the gear neutral condition and/or currently engaged ratio, and a transmission output shaft speed sensor 36. A vehicle brake monitor 38 senses actuation of vehicle brake pedal 40.

A transmission operator for an AMT system including a gear neutral switch may be seen by reference to U.S. Pat. No. 4,445,393, the disclosure of which is hereby incorporated by reference. The above mentioned devices supply information to and/or accept commands from a central processing unit or control 42. The central processing unit 42 may include analogue and/or digital electronic calculation and logic circuitry, the specific configuration and structure of which forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. A fault indicator or alarm 46 may display the identity of a specific fault or simply signal the existence of an unidentified fault. Drive train components and controls therefor of the type described above are known in the prior art and may be appreciated in greater detail by reference to above mentioned U.S. Pat. Nos. 4,445,393; 4,361,060; 3,776,048; 4,038,889; 4,226,295; 4,702,127 and 4,722,237.

Sensors 22,28,32,36,38 and 44 may be of any known type or construction for generating analogue or digital signals proportional to the parameter monitored thereby. Similarly, operators 17,18,26,30 and 34 may be of any known electrical, pneumatic or electropneumatic type for executing operations in response to command signals from processing unit 42 and/or for providing input signals thereto. Fuel control 26 will normally supply fuel to engine 14 in accordance with the operator's setting of throttle 24 but may supply a lesser (fuel dip) or greater (fuel boost) amount of fuel in accordance with commands from control unit 42.

Figure 2:
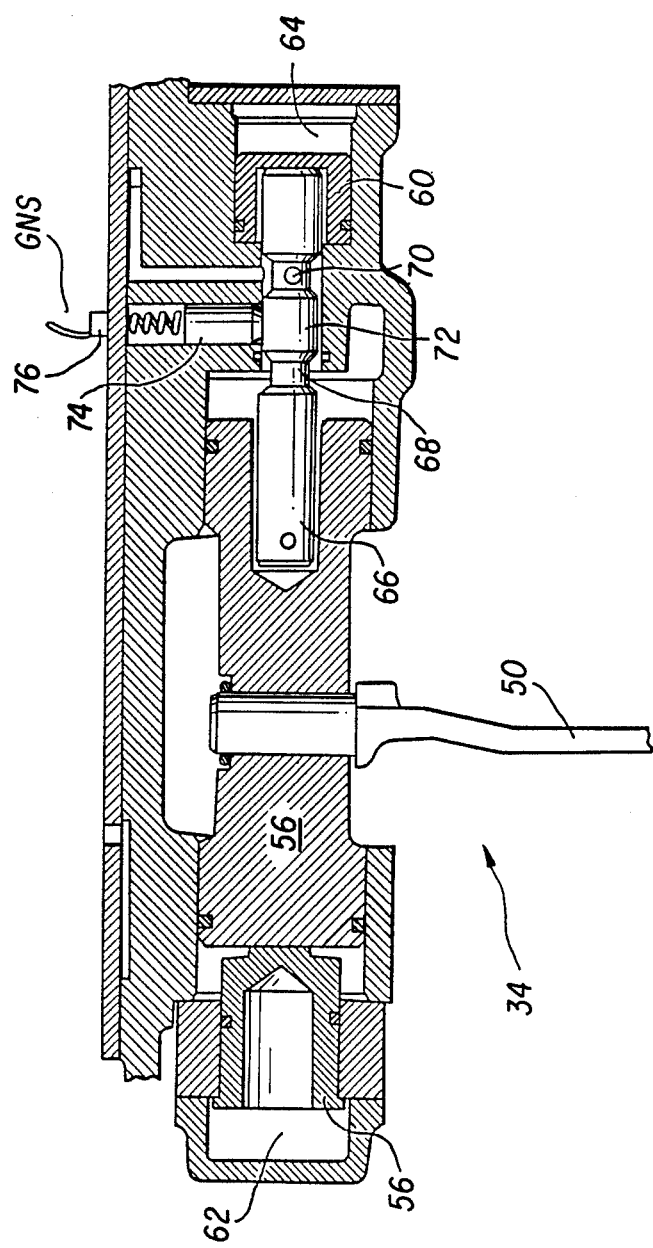
FIG. 2 is a partial sectional view of a transmission operator including a gear neutral sensor switch.

A portion of a typical transmission operator 34 may, for purposes of example only, be seen by reference to FIG. 2. Briefly, a shift fork 50 is carried by a shift rail 56 for axial movement therewith. A pair of opposed fluid actuated pistons, 58 and 60, are slidably and sealingly received in selectively pressurized cylinders, 62 and 64, respectively. A rod member 66 is axially movable with shift rod 56 and shift fork 50 and defines a pair of grooves, 68 and 70, separated by land 72. A spring biased plunger 74 cooperates with the land 72 to open gear neutral switch 76 and with grooves 68 and 70 to close gear neutral switch 76. The gear neutral switch 76 thus provides a gear neutral signal (GNS) having a first value (GNS=$\emptyset$) to indicate the gear neutral condition and a second value (GNS=1) to indicate the not gear neutral condition.

The gear neutral sensor input signal, GNS, if not previously declared faulty, is utilized by the AMT controller, or central processing unit, 42, to control shifting of automatic/semiautomatic mechanical transmission 12. For example, during a shift sequence when the transmission is being shifted from a previously engaged gear ($GR_L$) into neutral, if the GNS indicates a gear neutral condition exists, the synchronization procedure may proceed. Also, after synchronization has occurred and the transmission 12 is being shifted into the most recently selected gear ($GR_S$), if the GNS signal indicates that a not gear neutral condition exists, the transmission is considered engaged, or at least partially engaged, and the master clutch 16 may be re-engaged.

In the case of a fully automated AMT system 10, a purpose of the central processing unit 42 is to select, in accordance with a program (i.e. predetermined logic rules) and current or stored parameters, the optimal gear ratio at which the transmission should be operating and, if necessary, to command a gear change, or shift, into the selected optimal gear ratio based upon the current and/or stored information.

The various functions to be performed by central processing unit 42, and a preferred manner of performing same may be seen in greater detail by reference to U.S. Pat. No. 4,595,986 assigned to the assignee of this invention and to published Society of Automotive Engineers SAE paper No. 831776 published November 1983, the disclosures of which are hereby incorporated by reference.

The gear neutral switch or sensor 76 provides signals for processing by the central processing unit 42 which are important for optimal operation of the clutch operator 30, optimal selectiion of desired gear ratio and optimal synchronization of transmission 12 during an upshift or downshift. It is important that the inputs (GNS=$\emptyset$ or GNS=1) provided by sensor 76 be periodically verified, and, if a fault is detected, the faulty sensor be identified and a modified logic be utilized to control system 10 which is the identified faulty sensor.

Figure 3:
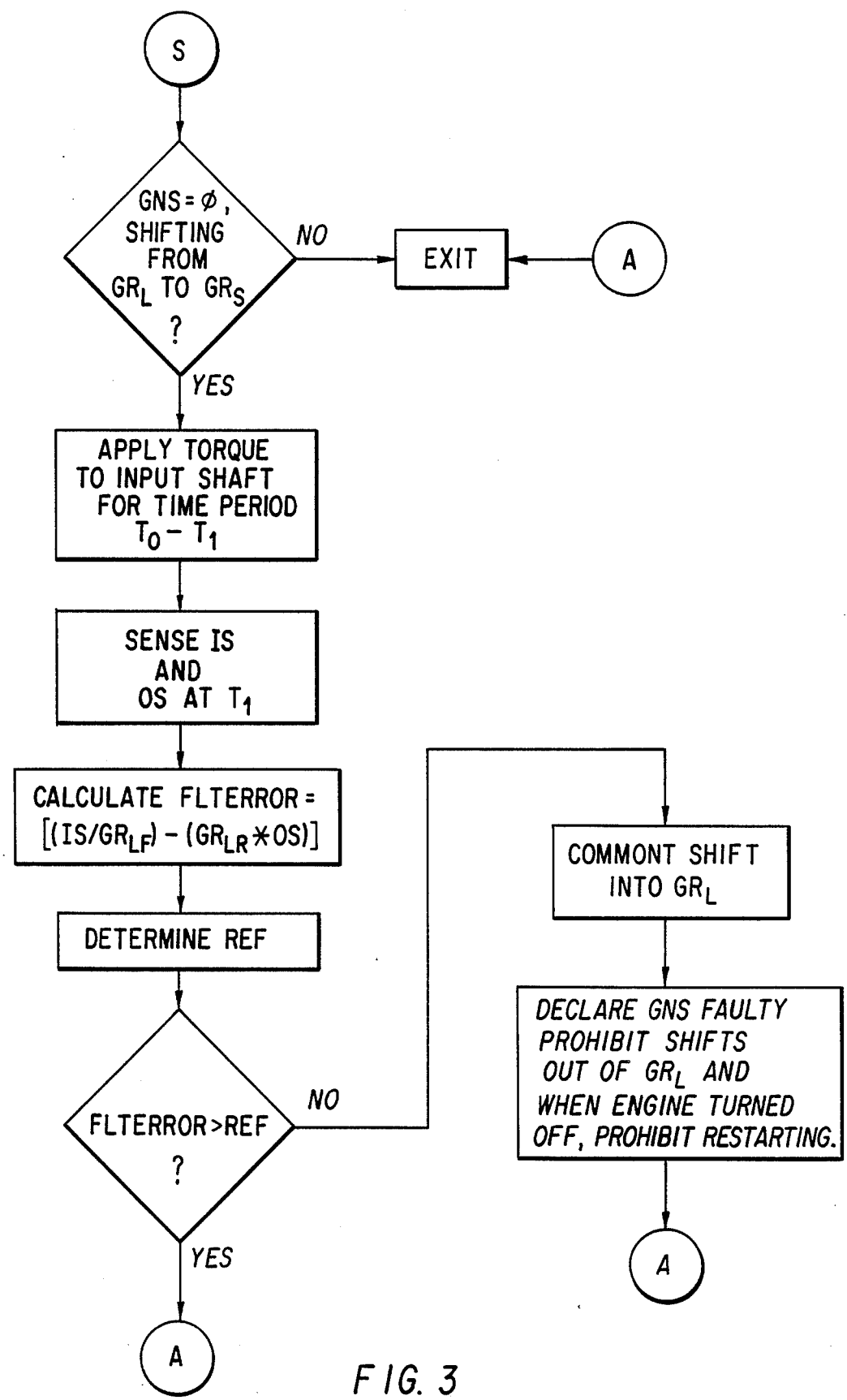
FIG. 3 is a symbolic illustration in the form of a flow chart, illustrating the preferred manner of practicing the method of the present invention.

The method of the present invention for verifying the inputs from the gear neutral sensor 76, for identifying a faulty input signal GNS, and for adapting an appropriate fault logic is schematically illustrated on FIG. 3. The symbol "$\emptyset$" is utilized to identify an equal, or substantially equal condition and the symbol "$>$" is utilized to identify a greater than relationship. As stated above, the control or CPU 42 receives various input signals and processes these and/or stored information in accordance with a program of predetermined logic rules to issue command output signals for operation of the AMT system 10.

Figure 4:
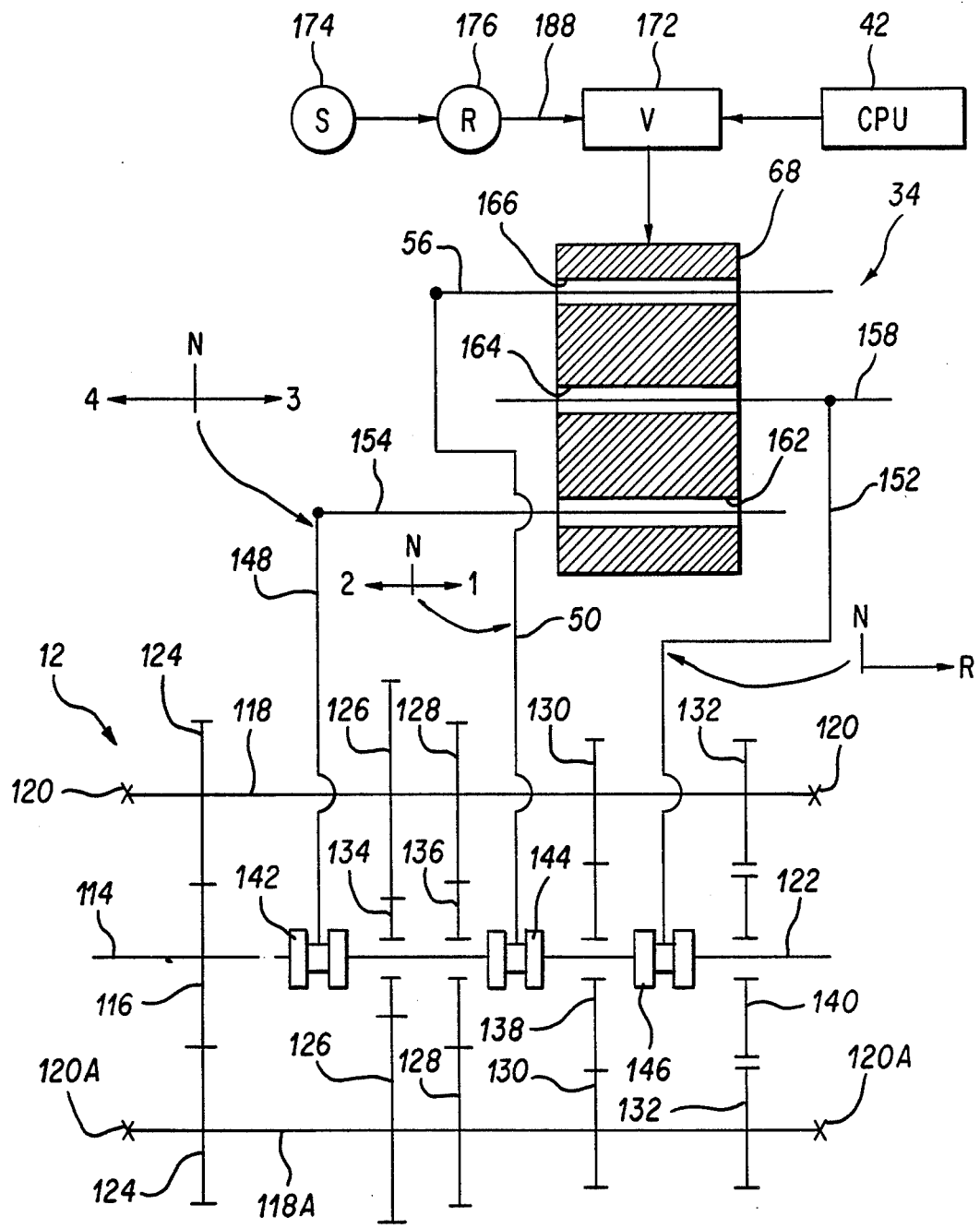
FIG. 4 is a schematic illustration of a simple mechanical change gear transmission, or a main section of a compound mechanical change gear transmission, of the type controlled by the present invention.

A typical five forward speed, single reverse speed, change gear mechanical transmission, or transmission 12 for use within system 10 is schematically illustrated in FIG. 4.

Transmission 12 is a simple transmission, or transmission section, of the twin countershaft type which is well known in the art, and which may be understood in greater detail by reference to U.S. Pat. Nos. 3,105,395; 4,735,109 and 4,152,949, the disclosure of which are incorporated by reference.

The illustrated transmission comprises an input shaft 114 carrying an input gear 116 for rotation therewith. Input shaft 114 is intended to be driven by prime mover 14 through a master clutch or torque converter as is well known in the art. A pair of substantially identical countershafts 118 and 118A are rotatably mounted in a housing (not shown) by means of bearings 120 120A. A main or output shaft 22 is provided which is preferably floatingly and/or pivotally mounted in the transmission housing.

Each of the countershafts 120 and 120A carries countershaft gears 124,126,128,130 and 132 fixed thereto for rotation therewith. Countershaft gear 124 is constantly meshed with the input gear 116. Third speed mainshaft gear 134 surrounds main shaft 122 and is constantly meshed with and supported by the countershaft gears 126. Second speed mainshaft gear 136 surrounds main shaft 122 and is constantly meshed with and supported by countershaft gears 128. First speed mainshaft gear 138 surrounds main shaft 122 and is constantly meshed with and supported by countershaft gears 130. The reverse mainshaft gear 140 surrounds mainshaft 122, and is constantly meshed with and supported by a pair of idler gears (not shown) which, in turn, are constantly meshed with and driven by countershaft gears 132. Preferably, as is well known in the art, mainshaft gears 134,136,138 and 140 are radially movable relative to mainshaft 122. The advantages of utilizing a floating mainshaft 22 and/or floating mainshaft gears are well known in the art and may be appreciated in greater detail by reference to the aforementioned U.S. Pat. No. 3,105,395.

Axially slidable clutches 142,144 and 146 are mounted, preferably by a splined connection, to mainshaft 122 for axial sliding movement relative thereto, and for rotation therewith. Clutch 142 may be moved to the left from the neutral position shown to selectively couple the mainshaft 122 directly with input gear 116 and input shaft 114 for fourth or direct drive of transmission 110 or moved rightwardly from the position shown to engage mainshaft gear 134 with mainshaft 122 for third speed operation of transmission 12. Clutch 144 may be moved from the position shown leftwardly to engage mainshaft gear 136 with mainshaft 122 for second speed operation or may be moved rightwardly from the position shown to engage mainshaft gear 138 with mainshaft 122 for first speed operation of transmission 12. Clutch 146 may be moved rightwardly from the position shown to engage mainshaft gear 140 with mainshaft 122 for reverse operation of transmission 12. Of course, clutches 142, 144 and 146 may be positive clutches, blocked clutches and/or synchronized clutches.

A shift fork or yoke 148 is received in a groove in clutch 142 for controlling the axial position of clutch 142 relative to mainshaft 122. A shift fork 50 is received in a groove in clutch 144 for axially controlling the position of clutch 144 relative to mainshaft 122. A shift fork 152 is received in an axial groove in clutch 146 for controlling the axial position of clutch 146 relative to mainshaft 122.

Shift bar housing assembly 34 includes three axially movable shift bars, also called shift rails or shift rods 154, 156 and 158 which are substantially parallel and independently axially slidable in substantially parallel bores 162, 164 and 166, respectively, in shift bar housing. Shift bar housing is mountable to the transmission housing (not shown) in a conventional manner. Shift fork 148 is axially movable with shift bar 154, shift fork 150 is axially movable shift bar 156 and shift fork 152 is axially movable with shift bar 158. Of course, various levers and/or other mechanical/fluid connections may be interposed between the shift bars and the shift fork as is well known in the art.

Central processing unit 42 will provide a signal indicative of desired engaged gear ($GR_s$) ratio to a valve assembly 172, which will typically comprise a plurality of individually controllable valves, such as solenoid valves, or the like. Valve assembly 172 is fluidly connected to a source of pressurized fluid, preferably a compressible fluid such as compressed air, from a source 174 which is preferably regulated by a regulator valve 176. Pressurized fluid valve assembly 172 may be of any one of a plurality of designs, and will provide pressurized fluid to the shift bar housing assembly to selectively axially position the shift bars. The command signals from controller valve assembly 172 may be fluid, electrical, mechanical or a combination thereof, as is well known in the art. Preferably, central processing unit 42 microprocessor based as illustrated in U.S. Pat. No. 4,595,986 and transmission 12 is utilized in an automatic mechanical transmission system of the type illustrated in U.S. Pat. No. 4,361,060, the disclosure of which is hereby incorporated by reference.

Transmission 10 is illustrated as utilizing positive, non-synchronized jaw clutches, as is well known in the art. Of course, frictional clutches, synchronized positive clutches and/or blocked clutches as are more fully described in U.S. Pat. Nos. 4,194,410; 3,924,484 and 3,799,002, the disclosures of which are hereby incorporated by reference, may be utilized. As only one of the clutches should be engaged at any one time to avoid damage to the transmission, shift bar housing assembly will include an interlock mechanism to prevent movement of more than one of the shift bars 154, 156 and 158 from the neutral axial positions thereof at a given time The details of construction of transmission or transmission section 12 and of the shift coils and clutches may be appreciated in greater detail by reference to above-mentioned U.S. Pat. Nos. 3,105,395; 3,799,002; 4,722,237 and 4,735,109.

This invention detects a false transmission neutral ($GNS = \emptyset$) indication for automatically/semiautomatically controlled mechanical transmissions that utilize a sensor 76 to indicate that the transmission is in a neutral state. In actuality, the sensor senses a position of a shift rail 136 or 138 rather than the engaged gear 56. The coupling to the sensor is through a shift yoke member 50 being driven by an air pressurized shift rail to a dog clutch 144 for the engaged gear. A false transmission neutral indication can readily occur due to deflections of the mechanical members, wear at the dog clutch, shift yoke or sensor mechanism, a malfunctioning sensor and the like.

Its purpose is to detect a false transmission neutral indication and provide a failsafe condition upon the detection of such a fault.

Should the signal be in error, and not be detected, damage to other system components may result along with the possibility of unsafe vehicle operation.

Upon sensing a command from CPU 42 to shift transmission from a last engaged gear ratio, $GR_L$, to a selected gear ratio, $GR_S$, and upon receiving an indication from the gear neutral sensors 76 that the transmission is in the gear neutral condition ($GNS = \emptyset$), periodically, preferably at least once during each period of time in which the various mechanical actuators can react to a command output signal, the logic or control method utilized in processing unit 42 will attempt to verify the nonfaulty operation of the gear neutral sensors 76, and, if a fault is detected, modify the control logic in a manner to provide failsafe modified operation.

Assuming central processing unit 42 is a microprocessor based control unit, a complete cycle of processing current and stored parameters and issuing command output signals can be accomplished in less than 15–20 milliseconds while a typical actuator, such as a solenoid controlled valve or the like, will require a minimum of 20–30 milliseconds to cause even initial movements of an operator such as clutch operator 30.

The gear neutral sensor circuit can fail in one of two ways, namely GNS can indicte a gear neutral condition (i.e. $GNS = \emptyset$) when the transmission 12 is actually not in neutral or the GNS circuit can indicate a not gear neutral condition (i.e. $GNS = 1$) when the transmission 12 is actually in neutral. Upon detecting either type of fault, the GNS signal from sensor 76 is considered faulty, is ignored, a fault indicator, such as indicator 46, is actuated, and the logic is modified.

Preferably, the first step is to verify the non-faulty operation of the gear neutral sensor indication ($GNS = \emptyset$) and if verified, to proceed with the remainder of the control algorithm.

Typically, the control algorithms for system 10 require the indication of a transmission neutral signal prior to taking any action to bring the transmission to synchronous. Once the sensors 76 indicate neutral, the control actuates a system component a fuel control for a burst of fuel or an input shaft brake that applies a torque to the input of the transmission bringing it to synchronous for the gear selected. The control system continuously monitors the input speed IS and output speed OS of the transmission and calculates a speed difference across the gears to be engaged, called error. At the same time, the system continuously calculates the speed difference for the last gear the transmission was in, called FLTERROR. If the transmission is truly in neutral, the value of error will decrease and the value of FLTERROR will increase as the input shaft approaches synchronous. Using these facts, an algorithm was designed, such that, during a shift and when the sensor indicates that the transmission is in neutral and a system component is commanded to apply a torque to the input of the transmission the value of FLTERROR is monitored and compared to a calibration value for a short period of time. The selection of the calibration value is based upon the speed steps between gears, minimum obtainable error values, and mechanical backlash between the measuring speed sensors. If during that period of time, the value of FLTERROR does not exceed the calibration value (REF), a fault is declared. This fault indicates that the transmission has not come out of gear, even though the sensor indicates that it has. Continuing to apply a torque to the input of the transmission further prevents it from coming to neutral due to torque lock on the clutches. Once the fault is established the system reselects the last gear and prohibits any further gear selections. Since it has already been established that the transmission did not come out of the last gear, no further synchronization is required. The control system allows the vehicle to continue to operate in the gear the fault occurred in (i.e. the last gear ratio $GR_L$) until the vehicle comes to a stop, at which time the vehicle is rendered disabled.

In a simple transmission, FLTERROR equals IS-OS*$GR_L$ while in a compound transmission, to calculate FLTERROR across the supposedly disengaged gear, FLTERROR equals $[(IS/GR_{LF})-(GR_{LR}*OS)]$ where $GR_{LF}$ and $GR_{LR}$ are, respectively, the front and rear $[(IS/GR_{LF})-(GR_{LR}*OS)]$ transmission section ratios in the last engaged transmission ratio.

The calibration value, REF, and the time during which a torque is applied to the input shaft 114 of the transmission will preferably vary with ratio steps between last gear ratio $GR_L$ and selected gear ratio $GR_S$, system backlash time required to come out of gear (usually not in excess of 100 milliseconds) and sensor accuracy. Further, for a more accurate system, FLTERROR may be integrated with respect to time to determine a relative rotation between expected input and output shaft positions which may be compared to a system backlash value.

Although the AMT system 10 has been described as utilizing a microprocessor based control 42 and the methods and operations carried out as software modes or algorithms, it is clear that the operations can also be carried out in electronic/fluidic logic circuits comprising discrete hardware components.

Clutch operator 30 is preferably controlled by the central processing unit 42 and may engage and disengage master clutch 16 as described in above-mentioned U.S. Pat. No. 4,081,065. Transmission 12 may include synchronizing means, such as an accelerator and/or a brake mechanism as described in U.S. Pat. No. 3,478,851, hereby incorporated by reference. The transmission 12 is preferably, but not necessarily, of the twin countershaft type as is seen in U.S. Pat. No. 3,105,395, hereby incorporated by reference.

Although the present invention has been set forth with a certain degree of particularity, it is understood the various modifications are possible without departing from the spirit and scope of the invention as hereinafter claimed.

I claim:

1. A method for controlling an at least partially automated mechanical transmission system (10) for devices having a throttle-controlled engine (14), a transmission having a plurality of gear ratio combinations selectively engageable between a transmission input shaft (114) and a transmission output shaft (20) said transmission input shaft being operatively connected to said engine by means of a selectably engageable and disengageable coupling (16) providing driving connection between said engine and said input shaft, said automatic mechanical transmission system comprising an information processing unit (42) having means for receiving a plurality of input signals including (1) a signal ($GR_L$) indicative of at least last engaged gear ratio of the transmission; (2) an input signal (IS) indicative of the rotational speed of the transmission input shaft; (3) an input signal (OS) indicative of the rotational speed of the transmission output shaft; and (4) an input signal (GNS) indicative of the gear neutral condition of said transmission, said gear neutral trial condition input signal having a first value (GNS=0) indicating the presence of a gear neutral condition and a second value (GNS=1) indicating the presence of a not gear neutral condition, said processing unit including means for processing said input signals in accordance with predetermined logic rules and for generating output signals whereby said transmission system is operated in accordance with said program, and means (34) associated with said transmission system effective to actuate said transmission system to effect engagement of said gear ratio combinations in response to said output signals from said processing unit, the method comprising the steps of:

during a commanded shift from a last engaged gear ratio ($GR_L$) to a selected gear ratio ($GR_S$), upon receiving an input signal (GNS=0) indicative of a gear neutral condition, sensing the presence and absence of faulty input signals indicative of the presence of a transmission gear neutral condition;

if said input signal indicative of transmission gear neutral condition is determined to be faulty, commanding an immediate shift directly into the last engaged ratio and prohibiting shifting from said last engaged gear ratio; and upon sensing a faulty signal indicative of a transmission gear neutral condition, prohibiting said coupling from engaging after shut down of said engine.

2. The control method of claim 1 wherein, sensing the presence of a faulty input signal indicative of a gear neutral condition comprises the steps of:

upon receiving a signal (GNS=0) indicative of a gear neutral condition, applying a torque to the input shaft of the transmission for a predetermined period of time;

then measuring input (IS) and output (OS) shaft speeds and calculating the error (FLTERROR) across the transmission based upon the last engaged ratio ($GR_L$); and comparing the absolute value of said error (FLTERROR) to a predetermined reference value, said input signal indicative of a gear neutral condition considered to be faulty if said error is not greater than said reference value.

3. The control method of claim 2 wherein, if said transmission is a simple transmission, said error (FLTERROR) is a function of the expression $[(IS)-(GR_L * OS)]$ where:

IS = a signal indicative of input shaft (114) speed,

OS = a signal indicative of output shaft (20) speed, and $GR_L$ a signal indicative of the last engaged gear ratio.

4. The control method of claim 2 wherein, if said transmission is a compound transmission comprising a front section connected in series with a rear section, said error (FLTERROR) is a function of the expression $[(IS/GR_{LF})-(GR_{LF}*OS)]$ where:

IS = a signal indicative of input shaft (114) speed,

OS = a signal indicative of output shaft (20) speed, $GR_{LF}$ = a signal indicative of the front section last engaged gear ratio; and $GR_{LR}$ = a signal indicative of the rear section last engaged gear ratio.

5. The control method of claim 3 wherein, said reference value (REF) varies with the value of $GR_L$.

6. The control method of claim 4 wherein, said reference value (REF) varies with at least one of the values of $GR_{LF}$ and $GR_{LR}$.

7. The method of claim 3 wherein, said reference value varies with the value of total transmission backlash in $GR_L$.

8. The control method of claim 4 wherein, said reference value varies with the value of total transmission backlash in $GR_L$.

9. The control method of claim 2 wherein, upon sensing a faulty signal indicative of a transmission gear neutral condition, said coupling will be prohibited from engaging after shut down of said engine.

10. The control method of claim 3 wherein, upon sensing a faulty signal indicative of a transmission gear neutral condition, said coupling will be prohibited from engaging after shut down of said engine.

11. The control method of claim 4 wherein, upon sensing a faulty signal indicative of a transmission gear neutral condition, said device engine will be prohibited from restarting after shut down thereof.

12. The control method of claim 1 wherein said applying a torque to said input shaft comprises engaging said coupling and momentarily increasing the speed of said engine.

13. The control method of claim 1 wherein said system includes an input shaft brake (18) controlled by said information processing unit (42) and said applying a torque to said input shaft comprises momentarily applying said input shaft brake to retard the rotational speed thereof.

14. A control system for controlling a mechanical transmission system (10) for vehicles having a throttle-controlled engine (14), a transmission (12) having a plurality of gear ratio combinations selectively engageable between a transmission input shaft and a transmission output shaft, said transmission input shaft being operatively connected to said engine by means of a selectably engageable and disengageable coupling providing driving connection between said engine and said input shaft, said automatic mechanical transmission system comprising an information processing unit having means for receiving a plurality of input signals including (1) an input signal indicative of at least last engaged gear ratio of the transmission; (2) an input signal indicative of the rotational speed of the transmission input shaft; (3) an input signal indicative of the rotational speed of the transmission output shaft; and (4) an input signal indicative of the gear neutral condition of said transmission, said gear neutral condition input signal having a first value indicating the presence of a gear neutral condition and a second value indicating the presence of a not gear neutral condition, said processing unit including means for processing said input signals in accordance with predetermined logic rules and for generating output signals whereby said transmission system is operated in accordance with said program, and means associated with said transmission system effective to actuate said transmission system to effect engagement of said gear ratio combinations in response to said output signals from said processing unit, the control system comprising:

means effective during a commanded shift from a last engaged gear ratio ($GR_L$) to a selected gear ratio ($GR_S$), upon receiving an input signal (GNS=0) indicative of a gear neutral condition, for sensing the presence and absence of faulty input signals indicative of the presence of a transmission gear neutral condition;

means effective, if said input signal indicative of transmission gear neutral condition is determined to be faulty, for commanding an immediate shift directly into the last engaged ratio and prohibiting shifting from said last engaged gear ratio; and upon sensing a faulty signal indicative of a transmission gear neutral condition, means effective to cause said vehicle engine to be prohibited from restarting after shut down thereof.

* * * * *